(12) United States Patent
Krause et al.

(10) Patent No.: US 7,225,521 B2
(45) Date of Patent: Jun. 5, 2007

(54) METHOD OF CONNECTING SHAPED PARTS MADE OF PLASTICS MATERIAL AND METAL

(75) Inventors: Frank Krause, Bergisch Gladbach (DE); Detlev Joachimi, Krefeld (DE)

(73) Assignee: LANXESS Deutschland GmbH, Leverkusen (DE)

( * ) Notice: Subject to any disclaimer, the term of this patent is extended or adjusted under 35 U.S.C. 154(b) by 155 days.

(21) Appl. No.: 10/920,543

(22) Filed: Aug. 18, 2004

(65) Prior Publication Data

US 2005/0042456 A1 Feb. 24, 2005

(30) Foreign Application Priority Data

Aug. 22, 2003 (DE) ................... 103 38 588

(51) Int. Cl.
*B21D 35/00* (2006.01)
*B23P 11/00* (2006.01)
(52) U.S. Cl. .................. 29/469.5; 29/525.14
(58) Field of Classification Search .......... 29/428, 29/460, 469.5, 505, 525.14; 428/411.1; 156/60; 264/482; 219/121.64
See application file for complete search history.

(56) References Cited

U.S. PATENT DOCUMENTS

| 4,449,014 A | * | 5/1984 | Brezinsky | .................. 174/107 |
| 5,190,803 A | | 3/1993 | Goldbach et al. | ........... 428/138 |
| 2002/0179234 A1 | | 12/2002 | Platz | ....................... 156/272.8 |
| 2005/0082265 A1 | * | 4/2005 | Yamabuki et al. | ..... 219/121.64 |

FOREIGN PATENT DOCUMENTS

| DE | 1 565 794 | | 4/1966 |
| DE | 38 38 895 | | 7/1990 |
| JP | 62064527 | | 9/1985 |
| JP | 62074629 | | 9/1985 |
| JP | 63064729 | | 9/1986 |
| JP | 06099502 | | 5/1992 |
| JP | 2003001455 | | 6/2001 |
| WO | 03/078138 | | 9/2003 |
| WO | WO03078138 | * | 9/2003 |

* cited by examiner

*Primary Examiner*—John C. Hong
(74) *Attorney, Agent, or Firm*—Nicanor A. Kohncke

(57) ABSTRACT

A method of connecting (fixedly joining/attaching) a shaped metal part and a shaped thermoplastics part together is disclosed. The method includes: (a) contacting a surface of the shaped metal part with a surface of the shaped thermoplastic part, thereby forming a contact region; and (b) melting a portion of the shaped thermoplastic part in the contact region by irradiating the shaped metal part with a laser (e.g., emitting a laser beam), thereby fixedly joining the shaped metal part and said shaped thermoplastic part together. Also disclosed is a plastic/metal composite article prepared by the method of the present invention.

10 Claims, 3 Drawing Sheets

METHOD OF CONNECTING SHAPED PARTS MADE OF PLASTICS MATERIAL AND METAL

CROSS REFERENCE TO RELATED PATENT APPLICATION

The present patent application claims the right of priority under 35 U.S.C. §119 (a)-(d) of German Patent Application No. 103 38 588.6, filed Aug. 26, 2003.

FIELD OF THE INVENTION

The invention relates to a method of connecting at least one shaped part made of metal and at least one shaped part made of plastics material, by irradiating the shaped metal part with a laser in a contact region between the shaped plastic and metal parts.

BACKGROUND OF THE INVENTION

Plastics/metal composite components which are produced by the injection molding of thermoplastic plastics material around functional elements have recently become widely used in the automotive and electrical industry,. Components for electrical applications, in which contact ducts through a housing wall are required, e.g., automotive fuse boxes or sensor housings, may be produced by the process of direct injection molding around elements. In such processes, a thermoplastic plastics material, e.g., a molding composition containing polyamide (PA) or polybutylene terephthalate (PBT) or PBT blend, is injection molded around the contact ducts, which are fixed in a cavity of an injection-molding tool. The contact ducts may be, for example, stamped metal sheets, which may be fabricated from copper or alloys containing copper. By means of the process of injection molding around elements it is also possible to integrate printed circuit boards, strip conductors or the like into the final molded plastics housingsmold.

The Applicants of the present invention realized that the process has the disadvantage, however, that only minimal adhesion is in most cases achieved between the metal components and the plastics components, so that the resulting composite is frequently not tight to media. Leakages therefore occur, which typically can only be eliminated by complex measures, e.g., by sealing with silicone or by treating the surface of the metal beforehand with an adhesion promoter (e.g., polyurethane dispersions, ethylene-vinyl acetate copolymer).

Adhesion of the plastics material to the metal may be also improved by preheating the metal. In order to achieve very good adhesion, however, it is necessary to bring the metal parts to a temperature in the region of the melting temperature of the thermoplastic material. Such a practice typically is not practical, especially in the case of thin-walled metal components, e.g., stamped metal sheets used for electrical applications. The temperature of corresponding injection-molding tools, at 60 to 90° C., is so low that even thoroughly preheated thin-walled metal parts inserted in the injection-molding tool cool to an unacceptably low temperature before the molten plastics material is injection molded around them.

SUMMARY OF THE INVENTION

One aspect of the present invention is to provide a method with which shaped parts made of thermoplastic plastics material can be connected in a tight manner to shaped parts made of metal, and good adhesion of the plastics material to the metal is achieved.

In accordance with the present invention, there is provided a method of fixedly joining/attaching (connecting) at least one shaped part fabricated from metal (1) and at least one shaped part fabricated from thermoplastics material (2) comprising:
(a) contacting a surface (12) of said shaped metal part (1) with a surface (17) of said shaped thermoplastic part (2), thereby forming a contact region (5); and
(b) melting a portion of said shaped thermoplastic part (2) in said contact region (5) by irradiating said shaped metal part (1) with a laser (more particularly with a laser beam 3, in an area that is preferably proximate to said contact area 5), thereby fixedly joining said shaped metal part (1) and said shaped thermoplastic part (2) together.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings in which preferred embodiments of the invention are illustrated and described.

Unless otherwise indicated, all numbers or expressions used in the specification and claims are understood as modified in all instances by the term "about."

BRIEF DESCRIPTION OF THE DRAWINGS

In FIGS. 1 through 3, like reference numerals designate the same components and structural features.

DETAILED DESCRIPTION OF THE INVENTION

Figure 1:
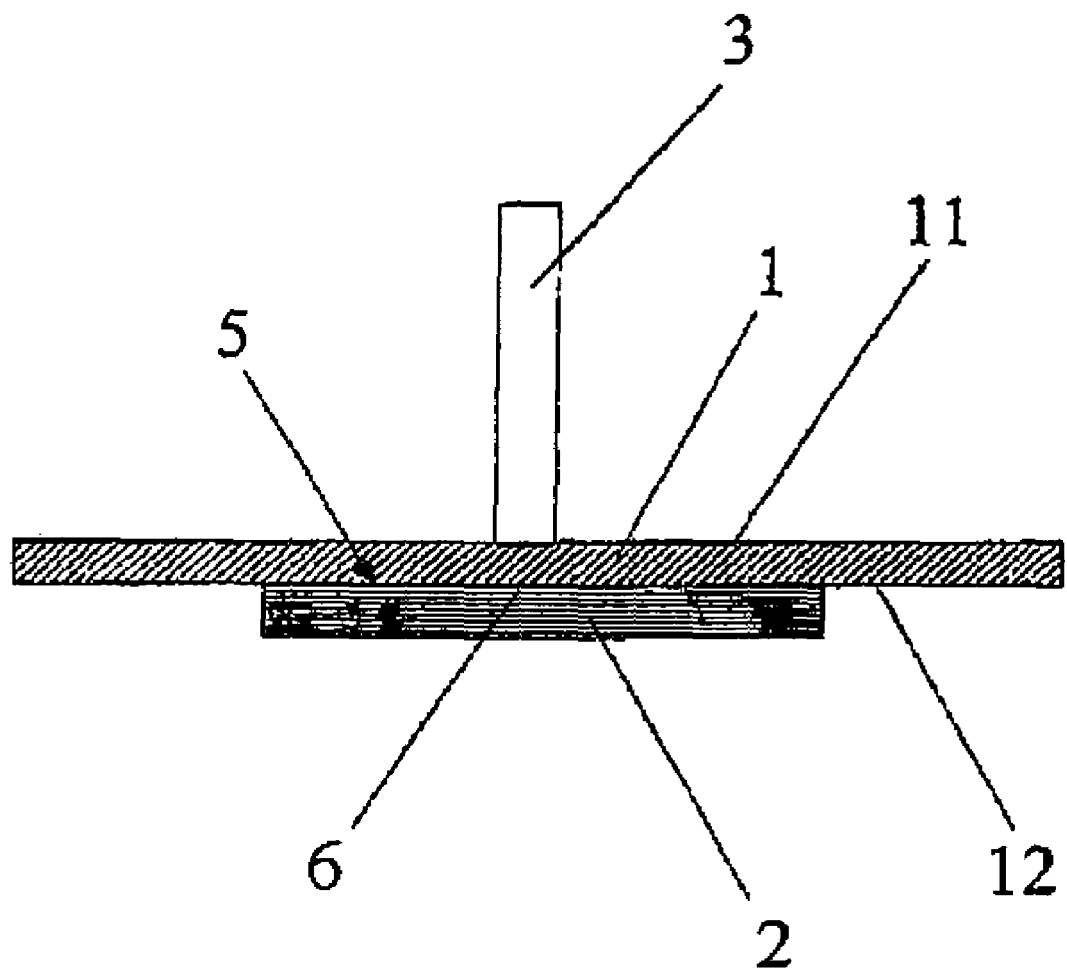
FIG. 1 is a representative diagrammatic depiction of an embodiment of the method according to the present invention wherein the shaped metal part (1) and the shaped thermoplastic part (2) are fixedly joined together by means of direct laser irradiation.

In the method according to the invention, the shaped parts made of metal and plastics material that are to be connected are first brought into contact with one another and held in position. The shaped parts are brought into contact with one another, for example, by being placed against one another, in one another or over one another. They touch one another in the contact region of the two shaped parts. The metal shaped part is then heated in the contact region by means of a laser until the melting point of the thermoplastic plastics material is reached and the plastics material melts. The metal shaped part may be treated with a laser either over the entire contact region or only in parts of the contact region. As a result of the melting of the plastics material in the region or regions in which the metal shaped part is irradiated with a laser, an adhesive connection is produced between the two shaped parts. These connecting regions (joint regions) may be of any geometry, for example, but not limited to, in point form, in line form or in the form of an area. During the laser irradiation and/or during solidification of the molten plastics material, a joining pressure is preferably applied to the shaped parts that are to be connected.

In a first embodiment of the method according to the invention, the metal shaped part is irradiated directly with the laser. This means that the surface of the metal shaped part that is not in contact with the plastics shaped part is irradiated. More particularly, the shaped metal part (1) has a surface (e.g., 11) that is opposed to the contact region (5), and the opposed surface (11) of the shaped metal part (1) is irradiated with the laser (e.g., laser beam 3). The metal shaped part is therefore irradiated on its surface remote from the plastics shaped part. In this embodiment, the thermoplastic plastics material can be chosen as desired.

In a second embodiment, the metal shaped part is irradiated indirectly with the laser. This means that the surface of the metal shaped part that is in contact with the plastics shaped part is irradiated. More particularly, the surface (e.g., 12) of the shaped metal part (1) that contacts the surface (e.g., 17) of the shaped thermoplastic part (2) in the contact region (5) is irradiated with the laser (e.g., laser beam 3). The metal shaped part is therefore irradiated on its surface facing the plastics shaped part, the laser beam passing through the plastics shaped part. In this embodiment, the thermoplastic plastics material must have adequate transmission in the wavelength range of the laser. The transmission in the wavelength range of from about 800 to about 1200 nm is preferably at least 15%.

Any desired combination of these two irradiation embodiments is possible. For example, in the case of indirect laser irradiation, an additional plastics shaped part can be arranged on the surface remote from the irradiated surface of the metal shaped part. Any desired thermoplastic plastics material can be chosen for the additional plastics shaped part. In addition, the shaped part made of metal can, for example, be connected with a plastics shaped part on both surfaces by means of laser irradiation. In that case, for example, a first shaped part made of any desired thermoplastic plastics material can be applied to a first surface of the metal shaped part by means of direct laser irradiation, and then a second shaped part made of a thermoplastic plastics material that is transparent for the wavelength of the laser can be applied to the second surface, remote from the first plastics shaped part, by means of indirect laser irradiation. In that manner, a plastics-metal-plastics sandwich structure is obtained.

In a further preferred embodiment, the strength of the connection between the two shaped parts is increased by texturing the surface of the metal shaped part. For example, the metal surface may be roughened. The mean depth of roughening (Rz) should be in the order of magnitude of from 20 to 300 µm. It may also exhibit notches, indentations, grooves or the like. In addition, the surface may be provided with undercuts.

Furthermore, in a preferred embodiment, the surface of the metal shaped part to be irradiated with the laser, i.e., the joint or contact region, is provided with at least one absorptive layer in order to increase absorption of the laser radiation. Such an absorptive layer contains substances, particles or the like, e.g., colorings or pigments, which exhibit maximum possible absorption of the laser wavelength. For example, a surface coating with added carbon black particles may be applied to the metal shaped part as the absorptive layer. The absorption of the absorptive layer is preferably at least 50%, particularly preferably at least 80% and very particularly preferably at least 95%.

In the case of metals that form absorbent oxides in the wavelength range of the laser, absorption of the laser radiation by the metal shaped part can also be increased by oxidizing the metal surface prior to the irradiation. This can be effected, for example, by chemical oxidation or by irradiation with a high-energy laser, especially of at least 100 W/mm$^2$.

The absorptive layer may also be an absorbent film which is arranged between the thermoplastic shaped part and the metal shaped part. There may be used as the absorbent film, for example, an extruded, extrusion-blown, cast or compression-molded thermoplastic molding composition having a preferred layer thickness of not more than 0.5 mm.

An absorptive layer which at the same time reduces reflection of the incident laser beam, which is often considerable at metal surfaces, is particularly advantageous.

The shaped parts made of metal and plastics material may be shaped parts of any desired type and geometry, for example sheets, open or closed profiles, hollow bodies or shells. They may be either finished components or semi-finished products.

Suitable metals that can be heated by means of the laser beam in accordance with the method of the invention are, for example, but not limited to, steel, stainless steel, aluminium, copper and alloys thereof, e.g., brass. It may be advantageous to clean and/or roughen the metal surface shortly before the laser irradiation or to use metals coated with adhesion promoters.

The wall thickness of the metal shaped part is usually, e.g., in the automotive sector, in the range of from 0.1 to 3 mm, particularly preferably from 0.3 to 1.5 mm. However, it is also possible to process shaped parts made of metal having a thickness of not more than 8 mm.

There come into consideration for the plastics shaped part any filled or unfilled and/or reinforced or unreinforced thermoplastic polymers or mixtures of such polymers. Where the metal is irradiated through the plastics material, the transmission properties of the plastics material are to be taken into account. Examples of possible thermoplastic polymers and copolymers include, but are not limited to, polyalkylene terephthalates, aromatic polyesters, polyamide, polycarbonate, polyacrylate, polymethacrylate, ABS graft polymers, polyolefins, such as polyethylene or polypropylene, polystyrene, polyvinyl chloride, polyoxymethylene, polyimide, polyethers and polyether ketones, that can be used individually or in the form of a blend of different polymers. The thermoplastic plastics material may be unreinforced or reinforced and/or unfilled or filled. It may also contain additives of any kind, for example, but not limited to, fireproofing agents, stabilizers, impact modifiers, nucleating agents and processing aids, for example, but not limited to, lubricants. Preferred plastics materials are polyamides, polyesters and blends thereof with further polymers.

The thermoplastic material of the shaped thermoplastic part may include a reinforcing material. Reinforcing materials that may be used include, for example, but not limited to glass fibers, glass beads, carbon fibers, metal flakes, polyamide fibers, nanoparticulate materials (e.g., having average particle sizes in the range of from 1 nm to 1000 nm, such as nanoparticulate clays), talc and mixtures thereof. The reinforcing fibers, and the glass fibers in particular, may have sizings on their surfaces to improve miscibility and/or adhesion to the plastics into which they are incorporated, as is known to the skilled artisan. Glass fibers are a preferred reinforcing material in the present invention. If used, the reinforcing material, e.g., glass fibers, is typically present in the thermoplastic material in a reinforcing amount, e.g., in an amount of from 5 percent by weight to 60 percent by weight, based on the total weight of the thermoplastic plastic material of the shaped thermoplastic part.

The thermoplastic material of the shaped thermoplastic part may further include one or more functional additives other than or in addition to the reinforcing materials. Additives that may be used include, but are not limited to, antioxidants, colorants, e.g., pigments and/or dyes, mold release agents, fillers (e.g., calcium carbonate and barium sulfate), ultraviolet light absorbers, fire retardants and mixtures thereof. Additives may be present in the thermoplastic material in functionally sufficient amounts, e.g., in amounts independently from 0.1 percent by weight to 10 percent by weight, based on the total weight of the thermoplastic plastic material of the shaped thermoplastic part.

The wall thickness of the plastics shaped part is usually in the range of from 0.5 to 4 mm. However, it is also possible to use plastics films having a thickness of from 10 to 500 µm. In addition, plastics shaped parts having a thickness of more than 4 mm may also be used. If, however, in the case of indirect irradiation, the laser beam is directed onto the metal shaped part through the plastics shaped part, then the wall thickness of the plastics material is dependent on its transmission properties. Adequate transmission of the plastics material for the laser wavelength must be ensured. The transmission should be at least 15%.

The preferred wavelength range of the laser is the infrared range from 800 to 1200 nm. As the laser beam source for the method according to the invention there may be used, for example, diode lasers having wavelengths of 808 nm, 940 nm or 980 nm or Nd: Yag lasers having a wavelength of 1064 nm. For the direct laser irradiation of the metal shaped part there are also suitable lasers having a higher wavelength. For example, a $CO_2$ laser having a wavelength of 10.6 µm can be used.

The energy or energy density of the laser is dependent on the particular application, inter alia on the chosen metal and plastics material and on the nature of the surface of the metal and the wall thickness of the shaped parts. In the case of small, thin metal shaped parts, a laser power of 60 W may be sufficient, while in the case of metal shaped parts having a large wall thickness, the required laser power may be 1000 W.

An advantage of the method according to the invention is the high degree of adhesion between the metal shaped part and the plastics shaped part, without additional adhesion promoter. The method allows an adhesive connection to be achieved between a thermoplastic plastics material and a metal without adhesion promoters or interlocking connection by means of injection molding around or through elements, crimping or the like. The connection exhibits a high degree of tightness. It is especially tight (substantially impervious) to liquids, such as, but not limited to, water.

It is an additional advantage that the laser irradiation permits not only connection over a relatively large area but also locally highly restricted connection between the two shaped parts. Moreover, the method is simple to carry out. The outlay in terms of energy is markedly lower in the method according to the invention compared with the preheating of metal shaped parts before injection of the plastics material in an injection-molding tool. In addition, plastics/metal composite components in sheet form that are produced by connecting a metal shaped part and a plastics shaped part by means of laser irradiation exhibit reduced buckling, i.e. the response level for local failure of the composite component, e.g., by buckling or bending on the introduction of force or when the composite component is subjected to bending or torsion, is increased.

In accordance with the present invention, there is also provided a plastics/metal composite article comprising a shaped part fabricated from metal and a shaped part fabricated from thermoplastic material, wherein said composite article is prepared by a method comprising:

(a) contacting a surface (12) of said shaped metal part (1) with a surface (17) of said shaped thermoplastics part (2), thereby forming a contact region (5); and (b) melting a portion of said shaped thermoplastic part (2) in said contact region (5) by irradiating said shaped metal part (1) with a laser (more particularly with a laser beam 3, in an area that is preferably proximate to said contact area 5), thereby fixedly joining said shaped metal part (1) and said shaped thermoplastic part (2) together.

Possible applications of the method according to the invention or of the plastics/metal composite components according to the invention are, for example, but not limited to, in the field of electrical equipment, especially automotive electrical equipment, where electrical conductors are, for example, sheathed with plastics material or provided with a plastics housing and sufficient tightness is required. These include, for example, connector strips, which are independent or are integrated into components, e.g., sensor housings or electronics housings. Applications in plastics/metal composite technology are also possible: as a result of the adhesion between the plastics material and the metal, the structural rigidity of a plastics/metal composite component can be increased. The method is suitable for all variants of plastics/metal composite technology, e.g for insert and outsert techniques, extrusion of profiles or films with a plastics/metal connection and also hybrid techniques, including as known from DE-A 03 838 895. The method can also be used in the case of multi-layer composite films having at least one metal film, for example, but not limited to, flexible conductor strips. A further field of application is plastics containers, plastics pipes or the like that have a metal film located on the outside or inside, e.g., for reducing permeation in fuel containers or for discharging electrostatic charge.

The method is not limited to the production of a connection between a metal shaped part and a plastics shaped part in the original process of producing a plastics/metal composite component. It can also be used for subsequently improving the plastics/metal connection, e.g., for restoring tightness in the case of repairs.

The invention is explained in greater detail below with reference to the accompanying drawings.

FIG. 1 shows in diagrammatic form a first embodiment of the method according to the invention, the direct laser irradiation of the metal shaped part. In the contact region 5 between the two shaped parts 1 and 2, the surface 12 of the metal shaped part 1 touches the surface 17 of the plastics shaped part 2. In the connecting region 6, a laser beam 3 is directed onto the surface 11 of the metal shaped part 1 that is remote from the plastics shaped part 2 (i.e., surface 11 which is opposed to the contact region 5 and connecting region 6). In the case of direct laser irradiation, therefore, the laser beam 3 is directed onto the surface 11 that is facing away from (opposed to) the plastics shaped part 2. As a result of the laser irradiation, an adhesive connection of the plastics shaped part 2 with the metal shaped part 1 is achieved in the connecting region 6. Heating of the metal surface 11 by the laser and the conduction of heat through the metal shaped part 1 result in the melting of the plastics shaped part 2 in the connecting region 6.

Figure 2:
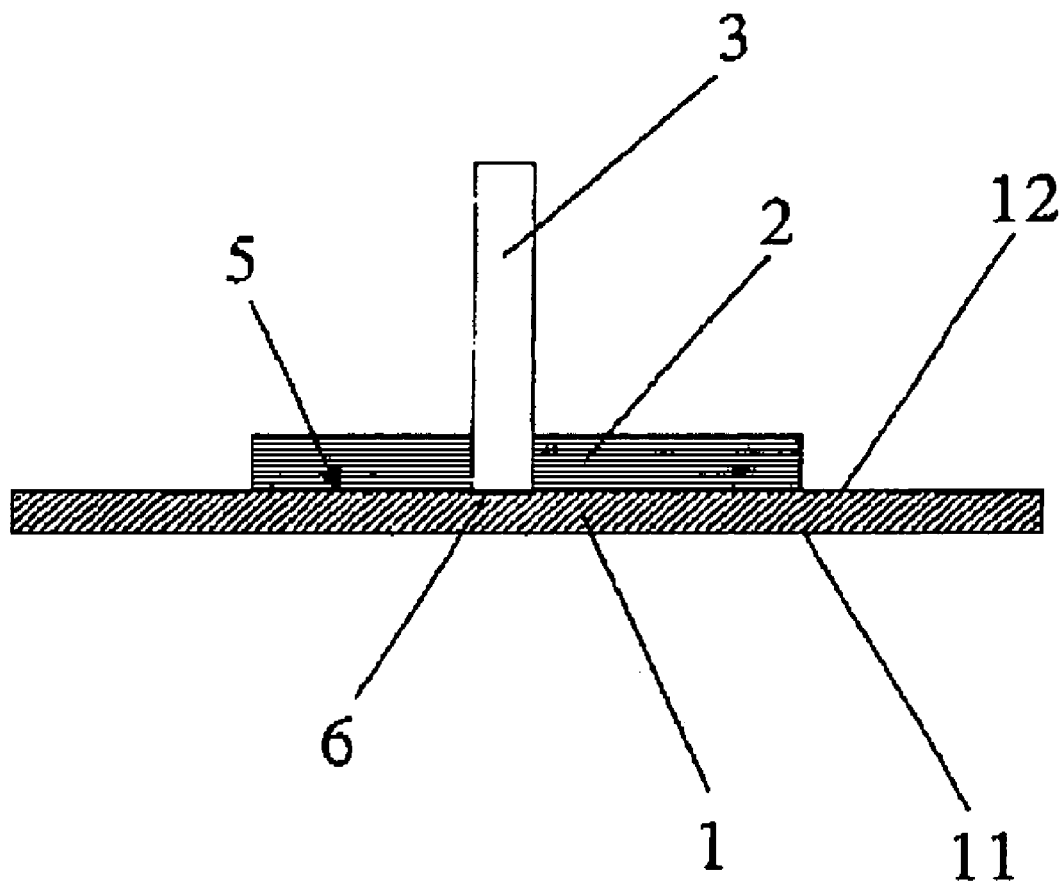
FIG. 2 is a representative diagrammatic depiction of a further embodiment of the method of the present invention wherein the shaped metal part (1) and the shaped thermoplastic part (2) are fixedly joined together by means of indirect laser irradiation.

An alternative embodiment, indirect laser irradiation, is shown in FIG. 2. In the connecting region 6 between the two shaped parts 1 and 2, the laser beam 3 is directed onto the surface 12 of the metal shaped part 1 that is touching surface 17 of the plastics shaped part 2. The shaped part 2 consists of a thermoplastic plastics material which has high transparency for the laser wavelength. The laser beam 3 passes through the plastics shaped part 2 and causes the plastics material 2 to melt in the connecting region 6 owing to heating of the surface 12 of the metal shaped part 1, as a result of which the two shaped parts 1, 2 are connected. In contrast to direct irradiation, the laser beam 3 is therefore directed in the case of indirect irradiation onto the surface 12 that is in contact with the plastics shaped part.

Figure 3:
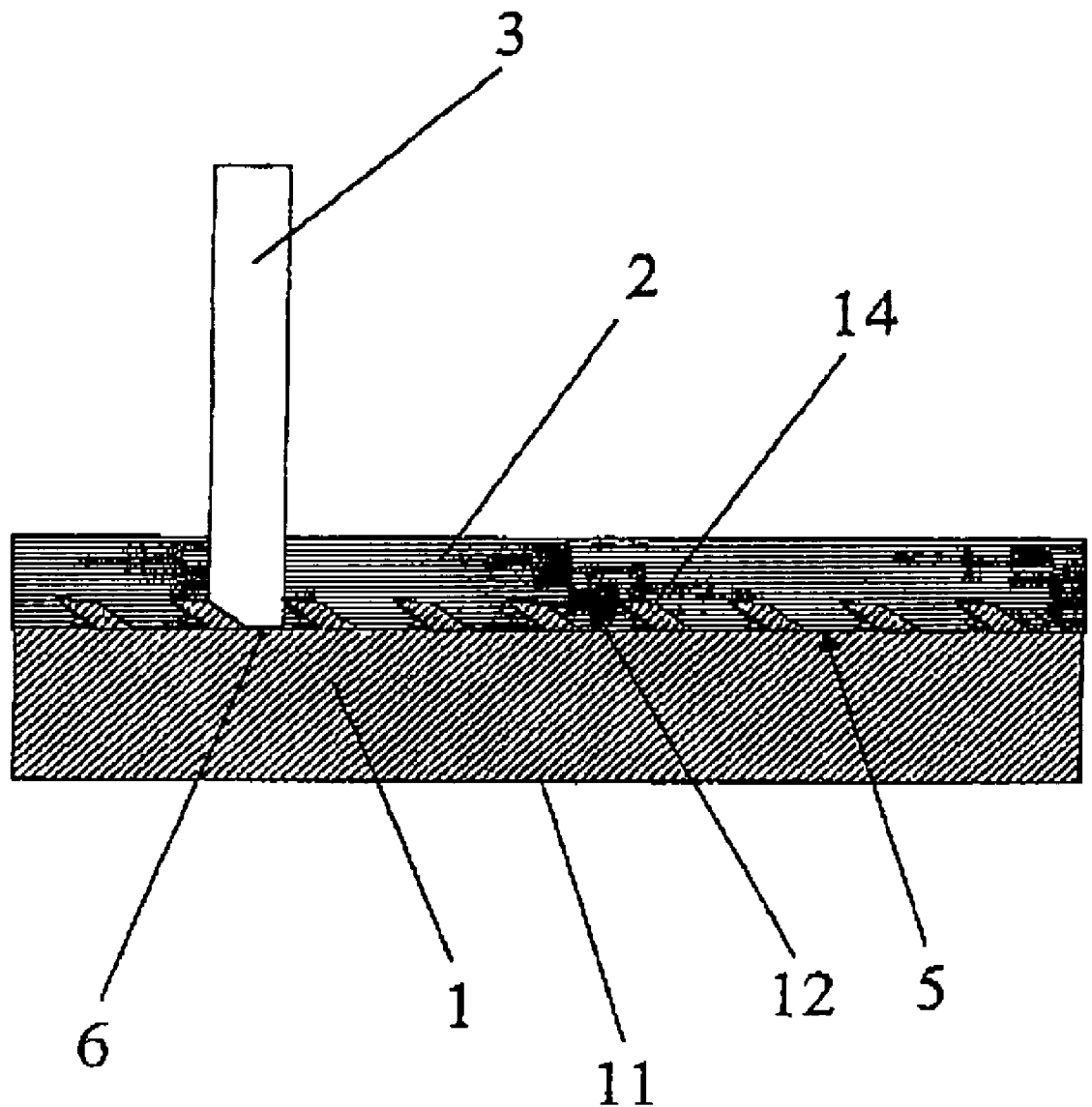
FIG. 3 is a representative diagrammatic depiction of a further embodiment of the method of the present invention wherein the shaped metal part (1) and the shaped thermoplastic part (2) are fixedly joined together by means of indirect laser irradiation, and the contact surface (12) of the shaped metal part (1) has undercuts.

In a further embodiment, shown in FIG. 3, the surface 12 of the metal shaped part 1 that is facing the plastics shaped part 2 has undercuts 14. In the connecting region 6, the metal shaped part 1 is heated indirectly, i.e., through the plastics shaped part 2, by a laser beam 3. The molten plastics material 2 is pressed into the undercuts 14 by the joining pressure (e.g., applied by pressing means, not shown). Alternatively, it would also be possible in this embodiment for the irradiation of the metal shaped part 1 by the laser beam 3 to take place directly at the surface 11.

EXAMPLE

A shaped metal part 1 made of ST37 steel was connected to a shaped thermoplastic part 2 made of unreinforced polyamide 6 (Durethan® B 30S from Bayer AG) by means of direct laser irradiation, as depicted diagrammatically in FIG. 1. The surface 12 of the metal shaped part 1 facing the plastics shaped part 2 had been phosphated (not shown in FIG. 1). The thickness of the metal shaped part 1 was 0.8 mm, the thickness of the plastics shaped part 2 was 1.2 mm.

The laser used was a Nd: Yag having a wavelength of 1064 nm and a power of 60 W.

In tests to determine the strength of the connection between the two shaped parts 1 and 2 (which had been fixedly joined in accordance with the method of the present invention), the tear strengths were found to be in the range of from 126 to 324 N.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method of fixedly joining at least one shaped part fabricated from metal and at least one shaped part fabricated from thermoplastics material comprising:
    (a) contacting a surface of said shaped metal part with a surface of said shaped thermoplastic part, thereby forming a contact region; and
    (b) melting a portion of said shaped thermoplastic part in said contact region by irradiating said shaped metal part with a laser, thereby fixedly joining said shaped metal part and said shaped thermoplastic part together.

2. The method of claim 1 wherein said shaped metal part has a surface that is opposed to said contact region, and said opposed surface of said shaped metal part is irradiated with said laser.

3. The method of claim 1 wherein said surface of said metal part that contacts said surface of said thermoplastic part in said contact region is irradiated with said laser.

4. The method of claim 1 wherein said surface of said metal part, that contacts said surface of said thermoplastic part in said contact region, is a textured surface.

5. The method of claim 4 wherein said textured surface is an undercut surface.

6. The method of claim 1 wherein said laser has a wavelength of 800 to 1200 nm.

7. The method of claim 1 wherein said shaped metal part is fabricated from a metal selected from the group consisting of steel, stainless steel, aluminum, copper and alloys of at least two metals thereof.

8. The method of claim 1 wherein said shaped metal part comprises a laser absorptive layer having an absorption of 800 to 1200 nm, and said laser absorptive layer is irradiated with said laser.

9. The method of claim 1 wherein the thermoplastic material of said shaped thermoplastic part comprises a material selected from the group consisting of reinforcing material, filler material and combinations thereof.

10. The method of claim 9 wherein said thermoplastic material is selected from the group consisting of polyamide (PA), polyester, polybutylene terephthalate (PBT), polystyrene (PS), syndiotactic polystyrene, acrylonitrile-butadiene-styrene (ABS), polybutylene terephthalate (PBT), thermoplastic polyurethane (PU), polyolefin, especially polypropylene (PP), polyethylene (PE), polycarbonate (PC), polypropylene oxide (PPO), polysulfone (PSO), polyphenylene sulfide (PPS), polyimide (PI), polyether ether ketone (PEEK) and combinations thereof.

* * * * *